United States Patent [19]
Nitsch et al.

[11] Patent Number: 4,466,579

[45] Date of Patent: Aug. 21, 1984

[54] CASSETTE FOR ROLLS OF PHOTOSENSITIVE MATERIAL

[75] Inventors: Wilhelm Nitsch, Munich; Erich Nagel, Anzing, both of Fed. Rep. of Germany

[73] Assignee: Agfa-Gevaert AG, Leverkusen, Fed. Rep. of Germany

[21] Appl. No.: 418,212

[22] Filed: Sep. 15, 1982

[30] Foreign Application Priority Data

Dec. 19, 1981 [DE] Fed. Rep. of Germany ....... 3150495

[51] Int. Cl.$^3$ ...................... B65H 17/02; B65H 23/06
[52] U.S. Cl. .............................. 242/67.1 R; 242/75.46
[58] Field of Search ..................... 242/67.1 R, 67.3 R, 242/75.46, 71.1, 71.7, 197, 198, 55.53, 55, 67.4; 355/72; 354/813, 314

[56] References Cited

U.S. PATENT DOCUMENTS

| | | | |
|---|---|---|---|
| 1,640,532 | 8/1927 | Coldwell | 242/75.46 |
| 1,904,411 | 4/1933 | Clayton | 242/75.46 X |
| 2,787,357 | 4/1957 | Segui | 242/67.3 R |
| 2,877,963 | 3/1959 | Hayden | 242/75.46 X |
| 4,111,379 | 9/1978 | Luscher | 242/71.1 |
| 4,221,479 | 9/1980 | Harvey | 242/71.1 X |
| 4,304,369 | 12/1981 | Landsness | 242/75.45 |

Primary Examiner—Jillions John M.
Attorney, Agent, or Firm—Peter K. Kontler

[57] ABSTRACT

A cassette for winding and unwinding rolls of photographic paper has a rotatable shaft which traverses the cassette. A spool for supporting a roll of photographic paper is mounted on and circumscribes the shaft. The shaft is supported by a pair of opposite sidewalls of the cassette. Bearing rings are mounted in each of the sidewalls and the shaft carries a pair of bearing disks which respectively mate with the bearing rings. The bearing rings and disks are designed such that they form a braking system for the shaft. An overrunning clutch is arranged between the shaft and each of the bearing disks. The overrunning clutches are oriented so that the shaft rotates freely when photographic paper is being wound onto the spool. During unwinding of photographic paper from the spool, the clutches engage and the braking system for the shaft becomes operative.

31 Claims, 5 Drawing Figures

CASSETTE FOR ROLLS OF PHOTOSENSITIVE MATERIAL

BACKGROUND OF THE INVENTION

The invention relates generally to a cassette or container for photosensitive material.

More particularly, the invention relates to a cassette or container for accommodating wound lengths or strips of photosensitive material, especially rolls of photographic paper.

A known cassette for rolls of photosensitive material has a housing which may be opened and closed and is impermeable to light when closed. A reel for winding and unwinding the rolls of photosensitive material is mounted on the housing and the latter has an aperture or slot through which the photosensitive material may be withdrawn from the housing and introduced therein. The reel carries a coupling member via which the reel may be connected to a drive unit for rotating the same.

Cassettes of the type outlined above are commonly used in photofinishing operations. In order to perform such an operation, a roll of unexposed photographic paper is loaded into a cassette in a darkroom. This is accomplished by opening the housing in order to gain access to the reel and then placing the roll on the reel. After the roll is loaded and the housing is closed, the cassette is brought into engagement with a copier. The photographic paper is unwound from the reel and fed into the copier via the slot in the cassette.

A second cassette is located on the side of the copier remote from the loaded cassette. The second cassette is identical to the loaded cassette but is empty. The photographic paper is wound into the empty cassette after exposure. Once the empty cassette has been loaded, it is removed from the copier and taken to a developing machine. The exposed photographic paper is then unwound into the developing machine via the slot in the cassette.

In order to wind photosensitive material into a cassette of the type under consideration, the reel is connected to a drive unit by means of the coupling member provided on the reel. The reel is designed to rotate easily during winding.

The photosensitive material is unwound from the cassette by exerting a pull upon the same. It has been found advantageous to exert a braking action upon the reel during the unwinding operation. To this end, the cassette is provided with a braking mechanism which is designed in such a manner that the braking force varies with the weight of the photosensitive material on the reel.

A cassette of the above type is disclosed in the German Offenlegungsschrift No. 26 17 233. The cassette includes a braking band or ring which engages a braking disk mounted on the reel. The design is such that the braking force depends upon the weight of the photosensitive material on the reel. This has the result that the tension in the photosensitive material during unwinding is essentially independent of the diameter of the roll of photosensitive material.

In order that the braking mechanism may be disengaged for a winding operation, the reel is mounted on a pair of support plates which may be pivoted up and down. By pivoting the support plates upwards, the braking disk is moved out of engagement with the braking band. Upward pivoting of the support plates is accomplished by means of guide blocks which are secured to the copier on which the cassette is placed. The guide blocks are designed in such a manner that they engage the reel and cause the same to be pivoted upwards as the cassette is placed on the copier.

Such a cassette is expensive, extremely complicated and subject to malfunctions. Furthermore, the cassette has the disadvantage that any copier with which it is used must be provided with devices for changing the position of the reel.

OBJECTS AND SUMMARY OF THE INVENTION

It is an object of the invention to provide a relatively simple container for rolls of photosensitive material.

Another object of the invention is to provide a relatively inexpensive container for rolls of photosensitive material.

An additional object of the invention is to provide a container which is capable of accommodating rolls of photosensitive material and is reliable in operation.

A further object of the invention is to provide a container capable of accommodating rolls of photosensitive material and having a braking mechanism for the rolls which may be disengaged when required by simple and inexpensive means.

A concomitant object of the invention is to improve a container of the type outlined above in such a manner that the braking mechanism may be disengaged without the use of devices secured to the apparatus on which the container is placed during operation.

The preceding objects, as well as others which will become apparent as the description proceeds, are achieved by the invention.

One aspect of the invention resides in a container for photosensitive material, particularly for rolls of photographic paper. The container comprises a housing for accommodating a length, e.g. a strip or band, of the photosensitive material in wound form. The housing has an aperture for introduction of the photosensitive material therein and withdrawal of the photosensitive material therefrom. A rotatable element is mounted on the housing and serves to wind and unwind the photosensitive material. Braking means is provided for braking rotation of the rotatable element. The container further includes clutch means arranged to permit braking of the rotatable element upon rotation of the latter in a first direction and to prevent braking of the rotatable element upon rotation of the same in a second direction.

The braking direction may be that in which the photosensitive material is unwound from the housing while the freewheeling direction may be that in which the photosensitive material is wound into the housing.

The clutch means may include an overrunning or freewheeling clutch. The clutch may be arranged between the rotatable element and the braking means.

The rotatable element may include a supporting member such as a reel or spool which is located internally of the housing and is capable of supporting a wound length of the photosensitive material. The braking means is then advantageously designed so that the braking force varies with the weight of the photosensitive material on the supporting member.

The rotatable element may be removably mounted on the housing and the latter may be designed to be opened and closed in order to permit the rotatable element to be mounted on and removed from the housing. The housing is advantageously substantially impermeable to light when closed.

The rotatable element may be provided with a coupling member which enables the rotatable element to be connected with a drive unit capable of rotating the same.

In accordance with the invention, control of the braking means is effected by making use of the fact that the rotatable element rotates in different directions during winding and unwinding of the photosensitive material. This makes it unnecessary to provide movable supports for the rotatable element as in the German Offenlegungsschrift No. 26 17 233 discussed earlier.

In order to mount the rotatable element on and to remove the same from the housing, the latter may be divided into two relatively movable portions. Mounting of the rotatable element on and removal of the same from the housing may be achieved in a particularly simple manner when the housing is divided along a plane which parallels the rotational axis of the rotatable element and passes close to or includes such axis.

The novel features which are considered as characteristic of the invention are set forth in particular in the appended claims. The improved container itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
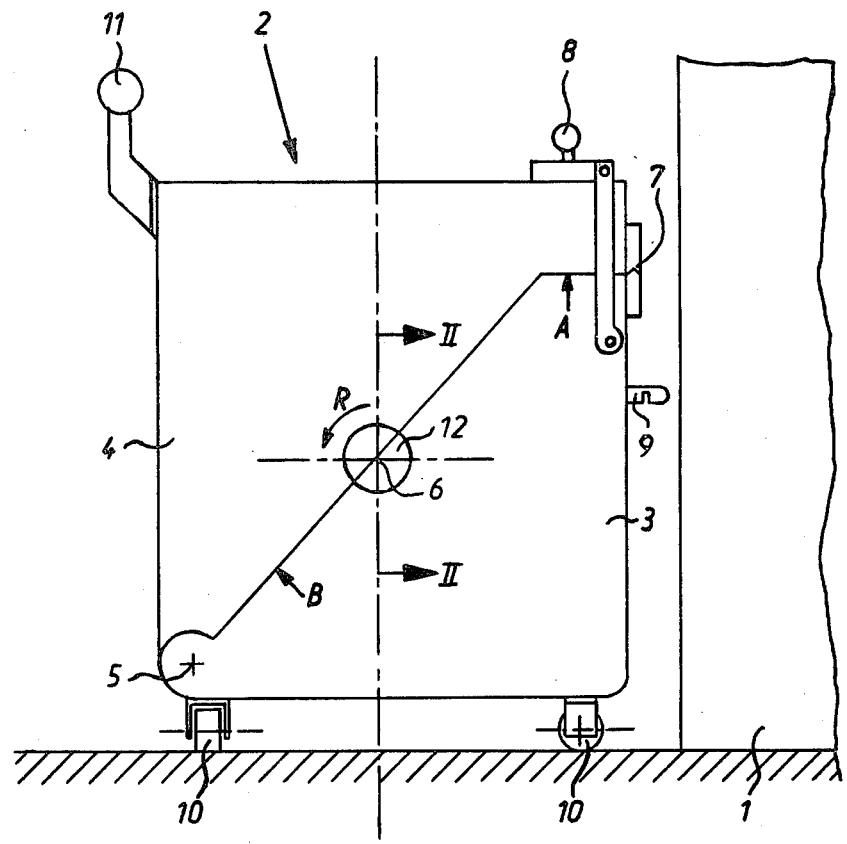
FIG. 1 is a side view of a container in accordance with the invention.

In FIG. 1, the reference numeral 1 identifies a photographic processing apparatus such as, for example, a copier or a developing machine for exposed photographic material. A cassette or container 2 which is to be connected to the processing apparatus 1 is located alongside the same.

Figure 2:
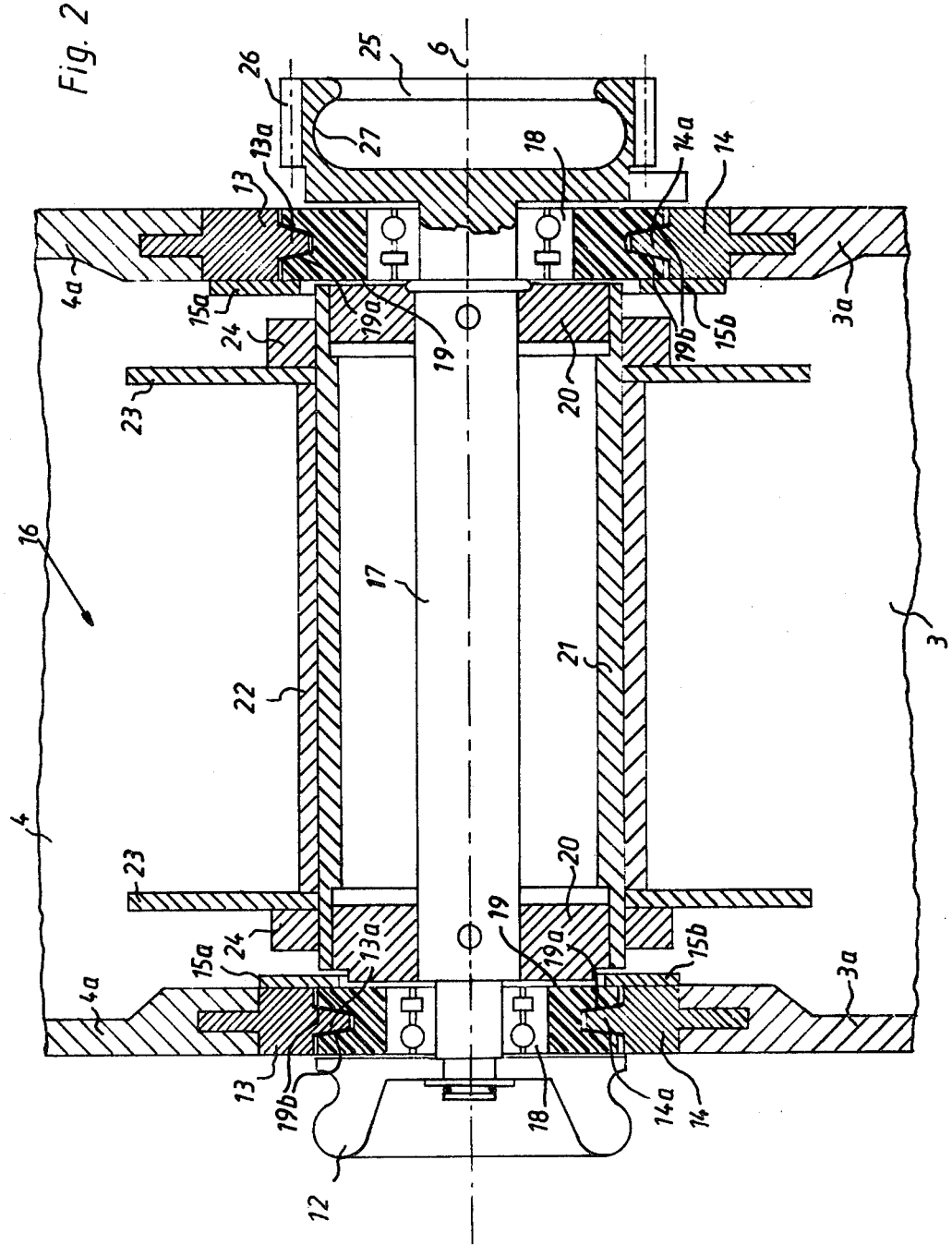
FIG. 2 is an enlarged cross-sectional view in the direction of the arrows II—II of FIG. 1.

The cassette 2 is designed to accommodate a roll of photographic paper in the form of a strip or a web. To this end, the cassette 2 is provided with a rotatable shaft 17 as shown in FIG. 2. The shaft 17 is mounted for rotation on an axis 6. Rotation of the shaft 17 in one direction makes it possible to unwind a roll of photographic paper which is supported on the shaft 17 while rotation of the latter in the opposite direction permits a strip or web of photographic paper to be wound into a roll about the shaft 17.

Returning to FIG. 1, the cassette 2 is provided with a slot or aperture 7. The photographic paper leaves the cassette 2 via the slot 7 during an unwinding operation and enters the cassette 2 by means of the slot 7 during a winding operation. The photographic paper travels in a plane A in the region of the slot 7.

The cassette 2 includes a housing which is divided into a lower portion 3 and an upper portion 4. The housing 3,4 is divided in the plane A as well as in a plane B which extends diagonally of the cassette 2. The plane B is parallel to the rotational axis 6 of the shaft 17 and may, but need not, include the axis 6. If the plane B does not include the axis 6, it is advantageous for the plane B to pass close by the axis 6, that is, the distance between the axis 6 and the plane B is preferably small.

The lower housing portion 3 and upper housing portion 4 are connected to one another by a pivot 5 located in the region of one of the lower corners of the housing 3,4. The lower housing portion 3 and upper housing portion 4 may thus be pivoted relative to one another from the closed position illustrated in FIG. 1 to an open position in which the interior of the housing 3,4 is accessible. The shaft 17 is mounted on the housing 3,4 in such a manner that it may be removed from the latter when the housing 3,4 is in its open position. The housing 3,4 is essentially impermeable to light in its closed position.

Locking elements 8 are provided in the region of the slot 7 to hold the lower housing portion 3 and the upper portion 4 together in the closed position of the housing 3,4.

The slot 7 is formed on that side of the cassette 2 which is designed to be situated adjacent to the processing apparatus 1 during use. A latch or hook 9 is provided on the same side of the cassette 2 and serves to secure the cassette 2 to the processing apparatus 1. The latch 9 may also function to generate a signal which, for example, indicates that a cassette is connected to the processing apparatus 1.

A manually actuable knob 12 is mounted on the shaft 17 externally of the housing 3,4. The knob 12 is rotatable on the axis 6 as indicated by the arrow R.

The bottom of the cassette 2 may be provided with rollers 10 while a handle 11 for manipulating the cassette 2 may be formed in the region of the upper end thereof.

As shown in FIG. 2, the lower housing portion 3 has a pair of sidewalls 3a which are spaced along the direction of the axis 6. Similarly, the upper housing portion 4 has a pair of sidewalls 4a which are spaced along the direction of the axis 6. A part-circular bearing section 13 is provided in each of the walls 4a in the region of the shaft 17. Likewise, a part-circular bearing section 14 is mounted on each of the walls 3a in the region of the shaft 17.

The bearing sections 13 have projections 13a whereas the bearing sections 14 have projections 14a. The projections 13a and 14a extend towards the shaft 17 in radial direction of the latter.

Each of the bearing sections 13 cooperates with the bearing section 14 on the same side of the cassette 2 to define an annular bearing member.

Disks 15a are mounted at the inner sides of the bearing sections 13, that is, at the sides of the bearing sections 13 located internally of the cassette 2. Disks 15b arranged to mate with the disks 15a in the closed position of the cassette 2 are mounted at the inner sides of the bearing sections 14. The disks 15a and 15b function as seals in the closed position of the cassette 2 to help prevent light from penetrating into the interior of the cassette 2.

The shaft 17 constitutes part of a winding and unwinding unit 16 which may be removed from and inserted into the cassette 2 as a whole. The unit 16 functions to wind photographic paper entering the cassette 2 into a roll and to unwind a roll of photographic paper accommodated inside the cassette 2 from the latter.

In addition to the shaft 17, the unit 16 includes a pair of spacer rings 20 which are mounted on the shaft 17 in the regions of the respective axial ends thereof. A cylindrical supporting member 21 is secured to the outer circumferences of the spacer rings 20. The outer diameter of the supporting member 21 essentially equals the inner diameter of the core of a roll of photographic paper to be wound onto or unwound from the unit 16. FIG. 2 illustrates a cardboard core 22 which has been slid onto the supporting member 21. The cardboard core 22 is confined between a pair of flanges 23 which are held against the cardboard core 22 by retaining rings 24. The retaining rings 24 are secured to the supporting member 21 by conventional, non-illustrated connecting elements.

In accordance with the invention, an overrunning or freewheeling clutch 18 is mounted at either axial end of the shaft 17. The clutches 18 are located outwardly of the respective spacer rings 20 as considered in the axial direction of the shaft 17. Each of the clutches 18 is designed with an inner race and an outer race. The inner races of the clutches 18 are secured to the shaft 17. On the other hand, a pair of annular bearing members 19 are secured to the outer races of the respective clutches 18. Each of the bearing members 19 is formed with a circumferential groove 19a which receives the projections 13a and 14a of the neighboring bearing sections 13 and 14. The grooves 19a are coated with layers 19b of a material having a high coefficient of friction, at least in those regions where the projections 13a and 14a contact the bearing members 19.

The bearing sections 13 and 14 together with the bearing members 19 define a braking mechanism for preventing rotation of the winding and unwinding unit 16.

As clearly seen in FIG. 2, the axial ends of the shaft 17 have different diameters. Correspondingly, the two bearing sections 13 have different diameters as do the two bearing sections 14 and the two bearing members 19. The purpose of this design is to ensure that the unit 16 can be inserted in the cassette 2 in only one orientation.

The knob 12 is located at that end of the shaft 17 having the smaller diameter. This is the left-hand end of the shaft 17 as seen in FIG. 2. As noted previously, the knob 12 is located externally of the cassette 2. The end of the shaft 17 having the larger diameter, that is, the right-hand end of the shaft 17 as seen in FIG. 2, carries an annular flange 25 which is also located externally of the cassette 2. Teeth 26 are formed on the circumference of the flange 25 and enable the shaft 17 to be coupled to a conventional, non-illustrated drive unit when photographic paper is to be wound onto the unit 16. A cavity 27 is provided in the flange 25. The cavity 27 makes it possible to readily grasp the flange 25 so that the latter may serve as a handle for manipulating the unit 16.

Figure 3:
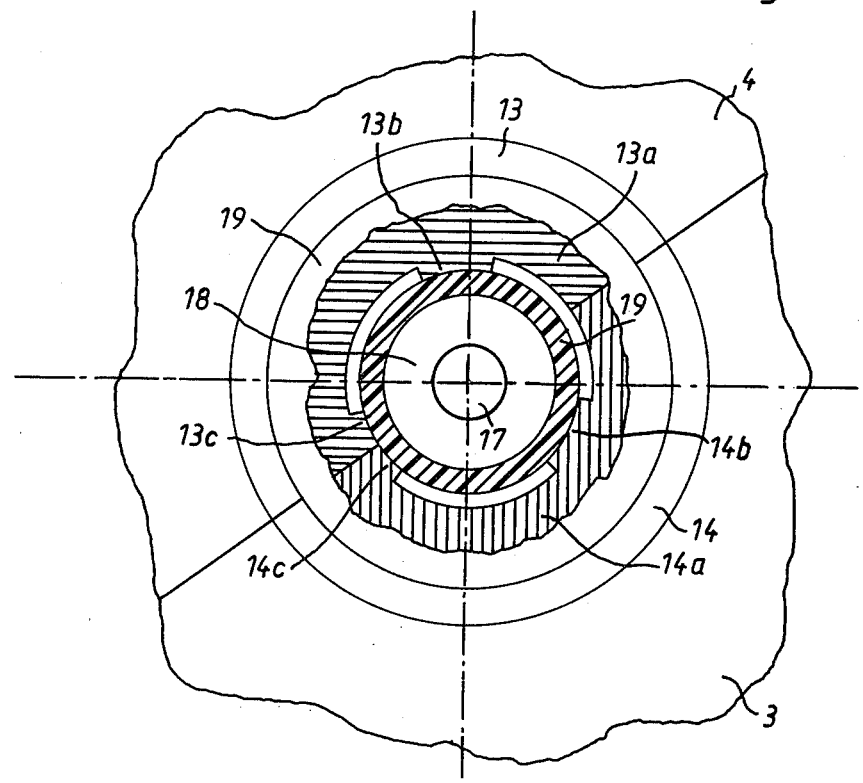
FIG. 3 is a partly sectional side view of another embodiment of a container according to the invention.

FIG. 3 is a partly sectional side view of another embodiment of a cassette according to the invention. In FIG. 3, the same reference numerals as in the preceding FIGS. have been used to identify like components. The projections 13a of the bearing sections 13 have circumferentially spaced protuberances 13b and 13c which engage the peripheral surfaces of the corresponding bearing members 19. Likewise, the projections 14a of the bearing sections 14 have circumferentially spaced protuberances 14b and 14c which bear against the peripheral surfaces of the corresponding bearing members 19.

In the illustrated embodiment, each of the bearing sections 13 has two protuberances 13b and 13c while each of the bearing sections 14 has two protuberances 14b and 14c. The two protuberances 13b and 13c have different circumferential lengths as do the two protuberances 14b and 14c. The two longer protuberances 13b and 14b have approximately the same circumferential length which is about double that of the shorter protuberances 13c and 14c. The longer protuberance 13b is circumferentially spaced from the associated bearing section 14 while the longer protuberance 14b is circumferentially spaced from the associated bearing section 13. The two shorter protuberances 13c and 14c are located adjacent to one another and cooperate to define a protuberance 13c, 14c having a circumferential length approximately equal to that of the longer protuberances 13b and 14b. The arrangement is such that the protuberance 13b, the protuberance 14b and the protuberance 13c, 14c are uniformly distributed about the circumference of the bearing member 19.

The embodiment of FIG. 3 enables a particularly good braking effect to be achieved.

Figures 4A, 4B:
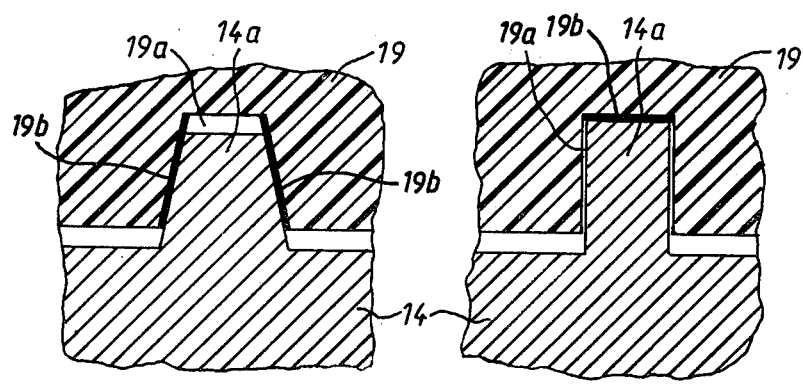
FIGS. 4a and 4b are cross-sectional views illustrating different configurations for the braking mechanism in accordance with the invention.

FIG. 4a is an enlarged cross-sectional view of a portion of the braking mechanism of FIG. 2. FIG. 4a illustrates that the projections 14a of the bearing sections 14, as well as the corresponding grooves 19a of the bearing members 19, may have trapezoidal cross sections. With this design, the lateral or inclined surfaces of the projections 14a constitute braking surfaces as do the lateral or inclined surfaces of the grooves 19a. It will be understood that the projections 13a of the bearing sections 13 have the same shape as the projections 14a.

FIG. 4b illustrates another embodiment of the braking mechanism. Here, the projections 14a and grooves 19a have rectangular cross sections. In this case, the braking surfaces are constituted by the circumferentially extending end surfaces of the projections 14a and the circumferentially extending inner surfaces of the grooves 19a. Again, the configuration of the projections 13a is identical to that of the projections 14a.

In principle, any materials may be used for the bearing sections 13,14 and the bearing members 19 as long as sufficient friction is generated at the braking surfaces. In the event that insufficient friction is generated by direct contact between the bearing members 19 and the cooperating bearing sections 13 and 14, either or both of two cooperating braking surfaces may be provided with a layer of a material having a high coefficient of friction. Layers 19b of such a material are formed on the bearing members 19 in FIGS. 2, 4a and 4b. Appropriate materials for the layers 19b are well-known.

It has been found advantageous to make the bearing members 19 of a synthetic resin which is provided with the layers 19b and to make the bearing sections 13 and 14 of steel. It will be understood that, alternatively, the bearing members 19 may be made of steel while the bearing sections 13 and 14 are composed of a synthetic resin which is provided with a layer of a material having a high coefficient of friction.

In operation, the cassette 2 is brought into a darkroom and opened by rotating the upper housing section 4 on the pivot 5. The unit 16 is removed from the cassette 2 and the retaining ring 24 at the end of the shaft 17 having the smaller diameter is disconnected from the supporting member 21. This makes it possible to remove the flange 23 located at the end of the shaft 17 having the smaller diameter so that a fresh roll of photographic paper may be loaded onto the supporting member 21.

The flange 23 and retaining ring 24 are replaced and the unit 16 is subsequently lowered onto the bearing sections 14 mounted in the lower housing portion 3. The different diameters of the two bearing sections 14, as well as the different diameters of the two corresponding bearing members 19 on the unit 16, insure that the unit 16 is seated on the cassette 2 in the proper orientation. The leading end of the roll of photographic paper is placed on the bottom surface of the slot 7 in such a manner that it projects to the exterior of the cassette 2. The cassette 2 is then closed.

The cassette 2 is transferred to the processing apparatus 1 which may, for example, be a copier, and is connected to the processing apparatus 1 by means of the latch 9. The photographic paper is now unwound from the unit 16 and fed into the processing apparatus 1 via conventional, non-illustrated transporting devices such as rollers.

The clutches 18 are so arranged that, when the unit 16 rotates in the unwinding direction for the roll of photographic paper, the clutches 18 are engaged or locked. As a result, the braking mechanism constituted by the bearing sections 13,14 and the bearing members 19 is operative and a braking action is exerted on the unit 16. At the beginning of the unwinding operation, the braking effect is large since the unit 16 supports a full roll of photographic paper and the total weight of the unit 16 and the roll is high. As the size of the roll decreases, the weight decreases also so that the braking effect is continuously diminished. By virtue of this arrangement, the tension in the photographic paper remains approximately constant throughout the unwinding operation.

The cassette 2 is connected to the processing apparatus 1 in the region of the inlet of the latter during unwinding operations. When the cassette 2 is to be used for a winding operation, that is, for taking up a strip of photographic paper which has been processed in the processing apparatus 1, the cassette 2 is attached to the processing apparatus 1 adjacent the outlet of the same.

The cassette 2 is initially empty for a winding operation. The leading end of the strip of photographic material passing through the processing apparatus 1 is introduced into the slot 7. If the processing apparatus 1 is a copier, the photographic material leaving the same is exposed. The cassette 2 may be provided with devices for guiding the leading end of the strip and initiating winding of the strip upon the core 22. However, this is not necessary for the invention and the cassette 2 may be opened to initiate winding of the strip upon the core 22 by hand.

The unit 16 is connected with a conventional, non-illustrated drive unit which may, for example, consist of an endless toothed belt driven by an appropriate motor. The teeth on the belt are brought into mesh with the teeth 26 on the flange 25 so that the unit 16 is set into rotation when the motor is actuated. The arrangement is such that the unit 16 is rotated in a direction opposite to the unwinding direction, that is, in a direction which causes the strip of photographic paper to be wound onto the unit 16.

The clutches 18 are oriented in such a manner that they freewheel when the unit 16 is rotated in the winding direction. This permits the shaft 17 to freely rotate in the clutches 18 while the bearing members 19 remain stationary. As a result, the shaft 17 is not subjected to a braking force.

After the photographic paper processed in the processing apparatus 1 has been wound onto the unit 16, the cassette 2 may be disengaged from the processing apparatus 1. If the photographic paper was exposed in the processing apparatus 1, the cassette 2 may be transferred to a developing apparatus. The photographic paper may then be unwound into the developing apparatus in the same manner as described earlier with reference to the processing apparatus 1.

By dividing the housing 3,4 of the cassette 2 into the lower housing portion 3 and the upper housing portion 4 along the diagonal dividing plane B, it becomes possible to place the unit 16 directly onto the lower bearing sections 14 in a simple manner. This facilitates mounting of the unit 16 on the cassette 2 and eliminates the need for centering the unit 16 after mounting.

The knob 12 and the cavity 27 in the flange 25 enable the relatively heavy unit 16 to be easily grasped.

The cassette 2 of the invention has the further advantage that no devices need be provided on the processing apparatus 1 for converting the cassette 2 from a condition in which it is adapted to unwind to a condition in which it is adapted to wind.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A container for photosensitive material, particularly rolls of photographic paper, comprising:
    (a) a housing for accomodating a length of the photosensitive material in wound form, said housing having an aperture for introduction of the photosensitive material therein and withdrawal of the same therefrom;
    (b) a rotatable element on said housing for winding and unwinding the photosensitive material;
    (c) braking means for braking rotation of said rotatable element; and
    (d) clutch means arranged to permit braking of said rotatable element upon rotation of the latter in a first direction and to prevent braking of said rotatable element upon rotation of the same in an opposite second direction, said clutch means including a freewheeling clutch which is coupled to and at least partly circumscribes said rotatable element, and said braking means comprising cooperating braking portions on said freewheeling clutch and said housing which at least partly circumscribe said freewheeling clutch.

2. A container as defined in claim 1, wherein said first direction is the direction in which the photosensitive material is unwound from said housing and said second direction is the direction in which the photosensitive material is wound into said housing.

3. A container as defined in claim 1, wherein said housing is openable.

4. A container as defined in claim 1, wherein said housing is substantially impermeable to light.

5. A container as defined in claim 1, wherein said rotatable element is removably mounted on said housing.

6. A container as defined in claim 1, wherein said rotatable element comprises a supporting member internally of said housing for supporting a wound length of the photosensitive material.

7. A container as defined in claim 6, wherein said braking means is designed so that the braking force varies with the weight of the photosensitive material supported by said supporting member.

8. A container as defined in claim 6, wherein said supporting member is substantially cylindrical.

9. A container as defined in claim 6, comprising a pair of spaced flanges on said supporting member for confining a wound length of the photosensitive material.

10. A container as defined in claim 1, comprising a coupling member for connecting said rotatable element to a drive unit.

11. A container as defined in claim 10, wherein said coupling member is located externally of said housing.

12. A container as defined in claim 10, wherein said coupling member comprises a gear which is carried by said rotatable element.

13. A container as defined in claim 1, wherein said clutch means is mounted on said rotatable element.

14. A container as defined in claim 1, wherein said braking portions comprise a first annular bearing member on said housing and a second annular bearing member on said freewheeling clutch.

15. A container as defined in claim 14, said clutch having an inner race and an outer race; and wherein said inner race is secured to said rotatable element and said outer race is secured to said second bearing member.

16. A container as defined in claim 1, wherein one of said braking portions is provided with a circumferentially extending groove and the other of said braking portions is provided with at least one projection which is received in said groove.

17. A container as defined in claim 16, wherein said one braking portion is mounted on said freewheeling clutch and said other braking portion is mounted on said housing.

18. A container as defined in claim 1, wherein at least one of said braking portions is provided with a coating having a high coefficient of friction, said coating being in engagement with the other of said braking portions.

19. A container as defined in claim 1, wherein one of said braking portions is composed essentially of a synthetic resin.

20. A container as defined in claim 19, wherein the other of said braking portions is essentially metallic.

21. A container as defined in claim 1, wherein one of said braking portions is essentially metallic.

22. A container as defined in claim 21, wherein said one braking portion is composed essentially of steel.

23. A container as defined in claim 1, wherein said housing is divided into a first portion and a second portion along a dividing plane which parallels and extends at least close to the axis of rotation of said rotatable element, said first and second portions being movable relative to one another so as to provide access to the interior of said housing.

24. A container as defined in claim 23, wherein said dividing plane extends diagonally of said housing.

25. A container as defined in claim 1, said rotatable element being elongated and having opposite longitudinal ends; and wherein said braking means comprises a braking unit in the region of each of said ends, said braking units being designed such that said rotatable element is properly mounted on said housing only when said rotatable element has a predetermined orientation.

26. A container as defined in claim 25, wherein said braking units have different dimensions.

27. A container as defined in claim 26, each of said braking units comprising a first annular bearing member on said housing and a second annular bearing member connected with said rotatable element; and wherein said first bearing members have different diameters and said second bearing members also have different diameters.

28. A container for photosensitive material, particularly rolls of photographic paper, comprising:
(a) a housing for accomodating a length of the photosensitive material in wound form, said housing having an aperture for introduction of the photosensitive material therein and withdrawal of the same therefrom, and said housing being divided into a first portion and a second portion which are movable relative to one another so as to provide access to the interior of said housing;
(b) a rotatable element on said housing for winding and unwinding the photosensitive material;
(c) braking means for braking rotation of said rotatable element, said braking means including cooperating braking portions on said rotatable element and said housing, and said braking portions comprising a first annular bearing member on said housing and a second annular bearing member on said rotatable element, said first bearing member being divided into a first section which is mounted on said first portion of said housing and a second section which is mounted on said second portion of said housing; and
(d) clutch means arranged to permit braking of said rotatable element upon rotation of the latter in a first direction and to prevent braking of said rotatable element upon rotation of the same in a second direction.

29. A container as defined in claim 28, wherein said first portion constitutes an upper portion of said housing and said second portion constitutes a lower portion of said housing.

30. A container as defined in claim 29, wherein said housing has an open position in which said second section of said first bearing member is accessible so as to permit said second bearing member to be engaged therewith and disengaged therefrom.

31. A container as defined in claim 30, wherein said rotatable element and said second bearing member are engageable with and disengageable from said housing as a unit.

* * * * *